March 4, 1952     J. MILLER ET AL     2,588,270

METER HOUSE

Filed Dec. 16, 1946

Joe Miller  INVENTORS
Joe W. Workman

BY

J. D. McKean

ATTORNEY.

Patented Mar. 4, 1952

2,588,270

UNITED STATES PATENT OFFICE 2,588,270

METER HOUSE

Joe Miller, Houston, and Joe W. Workman, Katy, Tex., assignors, by mesne assignments, to Standard Oil Development Company, Elizabeth, N. J., a corporation of Delaware Application December 16, 1946, Serial No. 716,574

5 Claims. (Cl. 220—3.8)

The present invention is directed to a structure adapted to house a flow meter in a pipe line.

It is common to the art to arrange a flow meter in a pipe line in order to record the volume of fluid passing therethrough; such meters usually require a small amount of attention at frequent intervals such as daily change of charts on the meter and general overhauling or major repairs at infrequent periods. When such meters are employed for metering natural gas produced from subsurface reservoirs, it is frequently necessary or desirable to arrange means for protecting the meter from low temperature atmospheric conditions. The fluid removed from gas fields often contains water vapor in addition to hydrocarbon gases and under the pressure conditions commonly prevailing in pipe lines, hydrates may form if the meter approaches the low temperature conditions prevailing during the colder periods of the winter months; such flow meters usually are constructed by arranging an orifice plate or flow nozzle in the pipe line and if hydrates form in the line adjacent the meter it will give incorrect readings and, in addition, the hydrates may plug the lines leading into and adjacent the meter and by build up of extreme pressures may cause the loss of mercury from the meter, rendering it wholly inoperable. Heretofore means have been adopted for preventing the meters from being chilled by contact with the atmosphere during winter months; such means include the building of houses to contain a meter which are sufficiently large for the workman to enter when overhauling or repairing the meter or houses so small that the workman cannot remain in the house when repairing a meter but the house being of such a configuration as to require it to be torn down before the meter is repaired and rebuilding after the repairs have been completed. It will be evident that the construction of a meter house sufficiently large for a workman to remain in when carrying out repairs on the meter is relatively expensive while houses constructed so that they must be disassembled before the meter is repaired and reassembled when the repairs are complete are inconvenient and adds an increased cost to the repairing of the meter.

It is an object of the present invention to devise a structure for housing a flow meter which will allow the temperature of the meter to be maintained substantially above that of the atmosphere during cold weather, which is relatively inexpensive, and which may be quickly and easily assembled when the repairs have been completed.

Other objects and advantages of the present invention may be seen from the following description taken with the drawing in which Fig. 1 is an isometric view of an embodiment of the present invention;

Figure 1:
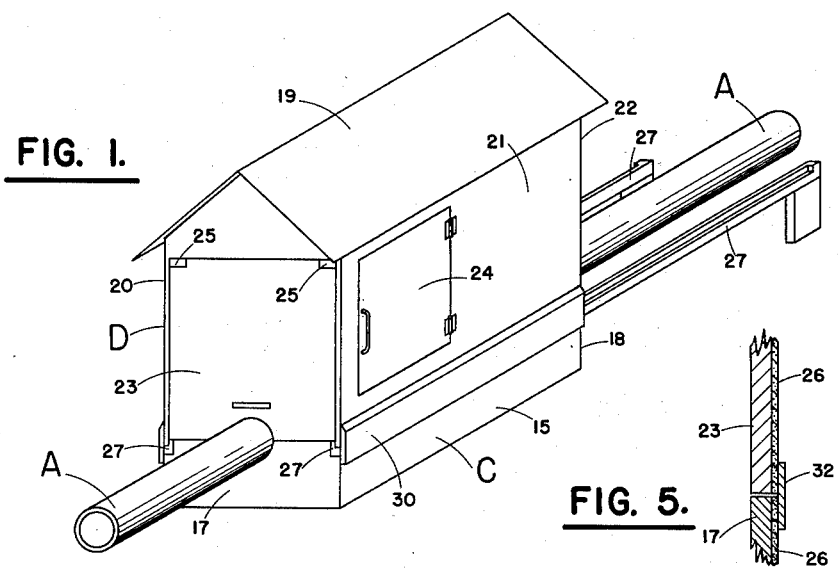

The device of the present invention may be described briefly as involving a base section arranged to remain stationary with respect to the pipe line containing a flow meter and a top section slidably arranged on the base section and defining an upwardly opening door which allows the top section to be slid off the base section without disturbing the meter when the door is in its open position. The top section and base section define circular openings at opposite ends of the structure for receiving the pipe line and the structure is sufficiently large to house the flow meter while at the same time its volume is of the same order of magnitude as the volume of the flow meter.

Turning now specifically to the drawing, a pipe line A has a flow meter B mounted thereon, the flow meter consisting of a pipe fitting 11 and a chart box 12 fluidly connected thereto through lines 13. It will be understood that fitting 11 may contain an orifice or flow nozzle and that such means are common to the art and, accordingly, the flow meter is not shown in detail. The flow meter is mounted in a meter house consisting of base member C, and a top member D.

The base member C includes floor 14, parallel walls 15 and 16 and parallel ends 17 and 18. End members 17 and 18 define semi-circular openings at the upper edge thereof lying on a line parallel with the longitudinal axis of the base.

Upper member D includes a roof 19, wall members 20, 21, end member 22 and upwardly opening door 23. Arranged in wall 21 is door 24 which is provided to allow an operator to examine the chart box and change charts thereon without further disturbing the structure.

Door 23 is hinged at its upper edge by suitable means such as hinges 25 whereby the door may be raised to leave the entire end of the upper section D free from any obstruction. It will be seen that the lower edge of door 23 and the lower edge of end 22 defines semi-circular openings which cooperate with the corresponding openings in wall members 17 and 18 to form circular openings snugly receiving pipe line A. An insulating lining 26 is provided to reduce the flow of heat from the interior to the exterior of the meter house. Attached to base member C are rail members 27 adapted to support top member D when slidably removed from base member C.

Upper member D and base member C are arranged to fit snugly to reduce the flow of fluid into and out of the meter house.

Figure 4:
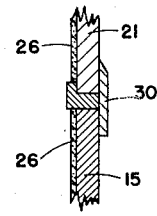
Fig. 4 is a fragmentary view showing the manner in which the walls and end sections of the upper sections are arranged with respect to the wall members of the base section.

An arrangement for making a snug fit between the base member and upper member is illustrated in Fig. 4 wherein a fragmentary view including a portion of the upper edge of member 15 of the base and the lower edge of wall member 21 is shown. It will be seen that wall member 21 rests on member 15 and, in addition, defines a downwardly extending lip 30 which extends below the joint between members 15 and 21 and subsequently engages with member 15. While a portion of walls 15 and 21 are shown in Fig. 4, it will be understood that walls 16 and 20, walls 18 and 22, and wall 17 and door 23 will be provided with similar arrangements to reduce the circulation of air from the exterior to the interior of the meter house. It will be further understood that air flow around the edges of the door may be reduced.

Figure 5:
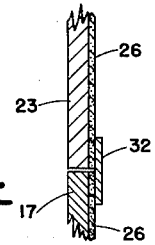
Fig. 5 is a fragmentary view showing the joint between the door of the meter house and the base section thereof.
Figure 2:
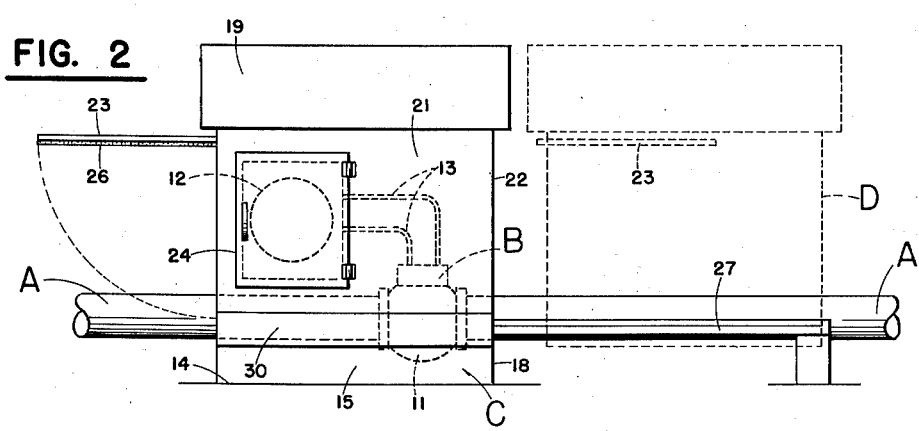
Fig. 2 is an elevation of the embodiment of Fig. 1 with the position of the upper portion of the meter house when removed from the base indicated by dotted lines.
Figure 3:
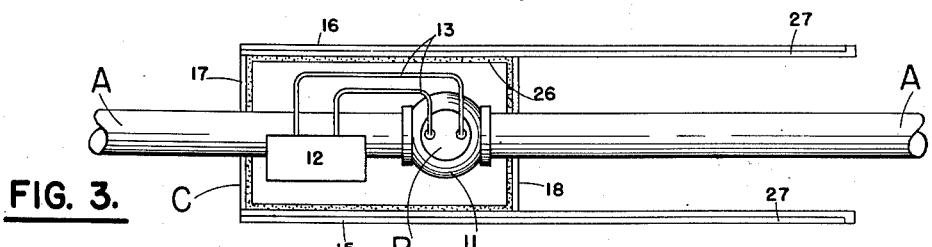
Fig. 3 is a top view partly in section of an embodiment of Fig. 1.

In Fig. 5 an arrangement is shown of a joint between end member 17 and door 23 for this purpose. It will be seen that door 23 is provided with a strip 32 making a frictional fit with the inner surface of wall 17. It will be understood that instead of the configuration shown in Figs. 4 and 5 for reducing the circulation of air into the meter house, other similar arrangements may be employed for reducing air flow while allowing upper section D to be slidably removed from base section B.

The gas conventionally transported through pipe lines is at a substantially higher temperature than prevailing atmospheric conditions. The gas removed from sub-surface reservoirs is usually at a temperature greater than the atmosphere. In addition, in long lines it is necessary to add energy to the gas to replace that lost by frictional contact of the flowing gas with the walls of the conduit; compression of the gas adds heat thereto. Accordingly, the gas usually transported, although it may contain moisture which will form hydrates in the gas line upon chilling, is usually at a temperature substantially above that which will cause the hydrates to form.

The provision of a close fitting meter house, preferably insulated, and having a volume of the same order of magnitude as the flow meter, in accordance with the present invention, together with the sensible heat of the gas being transported ordinarily will maintain the flow meter at a temperature above that which will cause the formation of hydrates. In other words, the provision of a meter house as shown in the present application will usually prevent the formation of hydrates in the meter without the addition of heat to the meter house from an outside source other than transmitted by the fluid in the pipe line. However, it will be understood that, if desired, other methods for supplying heat to the meter house as by the burning of a small gas flame may at times be desirable to prevent the formation of hydrates in the flow meter at this point in the gas line.

While we have shown a specific embodiment of the present invention, it will be evident to a workman skilled in the art that various changes in the size, shape and arrangement of parts may be made without departing from the scope of the invention and it is our invention to embrace such variations by the claims appended hereto.

Having fully described and illustrated an embodiment of the present invention, what we desire to claim as new and useful and to secure by Letters Patent is:

1. A structure adapted to house a flow meter arranged in a pipe line comprising, in combination, a base section with its longitudinal axis parallel with the axis of the pipe line defining a floor member, parallel end members and parallel wall members secured thereto, said end members defining arcuate openings for receiving the lower half of the pipe line, an upper section comprising a roof, an upwardly opening door comprising a first end member, depending parallel wall members and a second end member, said door, walls, and second end member fitting slidably on the base member to make a snug fit therewith and said door and second end member defining arcuate openings which taken with openings of the base member define circles snugly embracing said pipe line.

2. A structure adapted for housing a flow meter arranged in a pipe line comprising, in combination, a base section with upwardly extending parallel wall members and upwardly extending parallel end members secured to said base section with said end members defining arcuate surfaces to receive the lower half of the circumference of the pipe line and spaced apart to receive the meter between them, an upper section defining a roof, an upwardly opening door comprising a first end member, downwardly depending parallel wall members, and a downwardly depending second end member with the lower edge of the door, wall and end members fitting slidingly on the upwardly extending portions of the base member to define a snug fit therewith and with the lower edge of the door and the second end member defining curved surfaces cooperating with the corresponding surfaces of the end members of the base section to embrace the pipe line, said base section and upper section enclosing a space sufficiently large to receive the flow meter.

3. A meter house comprising, in combination, a base member provided with a floor, upwardly extending parallel end members and upwardly extending parallel wall members, an upper section slidably positioned on the base member and defining a roof, an upwardly opening door comprising a first end member, a downwardly extending second end member and downwardly extending parallel wall members, said base and upper sections cooperating to define a circular opening in each end of the structure for receiving the pipe line with said structure enclosing a space sufficiently large for enclosing a flow meter.

4. A meter house for a flow meter comprising, in combination, a rectangular base defining a floor, upwardly extending parallel end members each having a semi-circular opening and upwardly extending parallel wall members, an upper section slidably arranged on the base for removal in a direction parallel with the longitudinal axis of the base and defining a roof, a first end member defining a semi-circular opening, a door comprising a second end member defining a semi-circular opening and parallel wall members, said upper section cooperating with the base member to define circular openings in the ends of the house lying on a longitudinal axis of the meter, said door defining a semi-circular opening co-operating with the opening of the base member to form one of the circular openings and hinged at its upper edge to allow the upper section to slide over the flow meter when the door is in an upper position, the wall members of the upper section defining edges resting on the edges of corresponding wall members of the base section and flange members depending downwardly over the wall members of the base section to make a snug fit therewith, said meter house enclosing a space of sufficient magnitude to enclose the flow meter.

5. A device in accordance with claim 4 in which rail members are secured to the base member for supporting the upper member when it is slidably removed from the base member.

JOE MILLER.
JOE W. WORKMAN.

REFERENCES CITED

The following references are of record in the file of this patent:

UNITED STATES PATENTS

| Number | Name | Date |
| --- | --- | --- |
| 926,027 | Smith | June 22, 1909 |
| 1,715,538 | Dean | June 4, 1929 |
| 1,746,066 | Weiss | Feb. 4, 1930 |
| 1,817,307 | Haase | Aug. 4, 1931 |
| 1,883,507 | Bond | Oct. 18, 1932 |